US012315172B2

United States Patent
Miyada et al.

(10) Patent No.: US 12,315,172 B2
(45) Date of Patent: May 27, 2025

(54) INFORMATION PROCESSING APPARATUS, SYSTEM, INFORMATION PROCESSING METHOD, AND INFORMATION PROCESSING PROGRAM

(71) Applicant: Sony Interactive Entertainment Inc., Tokyo (JP)

(72) Inventors: Naoyuki Miyada, Tokyo (JP); Hideki Yanagisawa, Kanagawa (JP); Mamiko Ishida, Tokyo (JP); Masayoshi Mizuno, Tokyo (JP); Naoki Egawa, Kanagawa (JP); Hiromasa Naganuma, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/252,777

(22) PCT Filed: Nov. 10, 2021

(86) PCT No.: PCT/JP2021/041274
§ 371 (c)(1),
(2) Date: May 12, 2023

(87) PCT Pub. No.: WO2022/107651
PCT Pub. Date: May 27, 2022

(65) Prior Publication Data
US 2023/0394678 A1    Dec. 7, 2023

(30) Foreign Application Priority Data
Nov. 17, 2020  (JP) .................. 2020-191103

(51) Int. Cl.
*G06T 7/246*  (2017.01)
*G06F 3/01*   (2006.01)
(Continued)

(52) U.S. Cl.
CPC ............. *G06T 7/246* (2017.01); *G06F 3/011* (2013.01); *G06F 3/016* (2013.01); *G06T 7/73* (2017.01);
(Continued)

(58) Field of Classification Search
CPC .. G06T 7/246; G06T 7/73; G06T 7/97; G06T 2207/20081; G06T 2207/30196;
(Continued)

(56) References Cited

U.S. PATENT DOCUMENTS 9,083,960 B2    7/2015  Wagner
9,389,693 B2    7/2016  Lee
(Continued)

FOREIGN PATENT DOCUMENTS

JP    2014535098 A    12/2014
JP    2016085487 A     5/2016
(Continued)

OTHER PUBLICATIONS

International Search Report for corresponding PCT Application No. PCT/JP2021/041274, 4 pages, dated Feb. 15, 2022.
(Continued)

*Primary Examiner* — Sahlu Okebato
(74) *Attorney, Agent, or Firm* — Kilpatrick Townsend & Stockton LLP

(57) ABSTRACT

In combination, a detection section detects a target based on a first image signal from a first image sensor, a setting section sets an area of interest in which at least part of the target is included, a calculation section calculates, based on a second image signal from a second image sensor that asynchronously generates an image signal when a change in intensity of light incident on each of pixels is detected, a distribution of the second image signal in the area of interest, a tracking section tracks the detection target in the area of interest on the basis of at least one of the first image signal and the second image signal, a tracking controlling section discerns a movement of the detection target in the area of interest based on the tracking, and an information outputting section outputs a result of the tracking by the tracking section.

20 Claims, 8 Drawing Sheets

(51) Int. Cl.
  *G06T 7/00* (2017.01)
  *G06T 7/73* (2017.01)
  *G06V 10/25* (2022.01)
  *G06V 40/10* (2022.01)
(52) U.S. Cl.
  CPC .............. *G06T 7/97* (2017.01); *G06V 10/25* (2022.01); *G06V 40/10* (2022.01); *G06T 2207/20081* (2013.01); *G06T 2207/30196* (2013.01)
(58) Field of Classification Search
  CPC .......... G06F 3/011; G06F 3/016; G06F 3/017; G06V 10/25; G06V 40/10
  See application file for complete search history.

(56) References Cited

U.S. PATENT DOCUMENTS

| | | | |
|---|---|---|---|
| 9,747,523 B2 | 8/2017 | Yamamoto | |
| 10,311,833 B1 | 6/2019 | Qiu | |
| 11,122,224 B2 | 9/2021 | Suh | |
| 2010/0166260 A1* | 7/2010 | Huang | G06V 10/22 382/103 |
| 2012/0119987 A1* | 5/2012 | Im | G06F 3/0304 345/156 |
| 2014/0139639 A1 | 5/2014 | Wagner | |
| 2014/0320403 A1* | 10/2014 | Lee | H04N 25/47 345/156 |
| 2016/0117840 A1 | 4/2016 | Yamamoto | |
| 2018/0315247 A1* | 11/2018 | Van Andel | G06F 3/017 |
| 2020/0236311 A1 | 7/2020 | Suh | |
| 2020/0273180 A1 | 8/2020 | Kaufman | |

FOREIGN PATENT DOCUMENTS

| | | |
|---|---|---|
| JP | 2016514384 A | 5/2016 |
| JP | 2018085725 A | 5/2018 |
| WO | 2020034078 A1 | 2/2020 |

OTHER PUBLICATIONS

EP21894525.1, "Extended European Search Report", Oct. 10, 2024, 9 pages.

Tedaldi, et al., "Feature Detection and Tracking with the Dynamic and Active-Pixel Vision Sensor (DAVIS)", Second International Conference on Event-based Control, Communication and Signal Processing, Jun. 1, 2016, 7 pages.

* cited by examiner

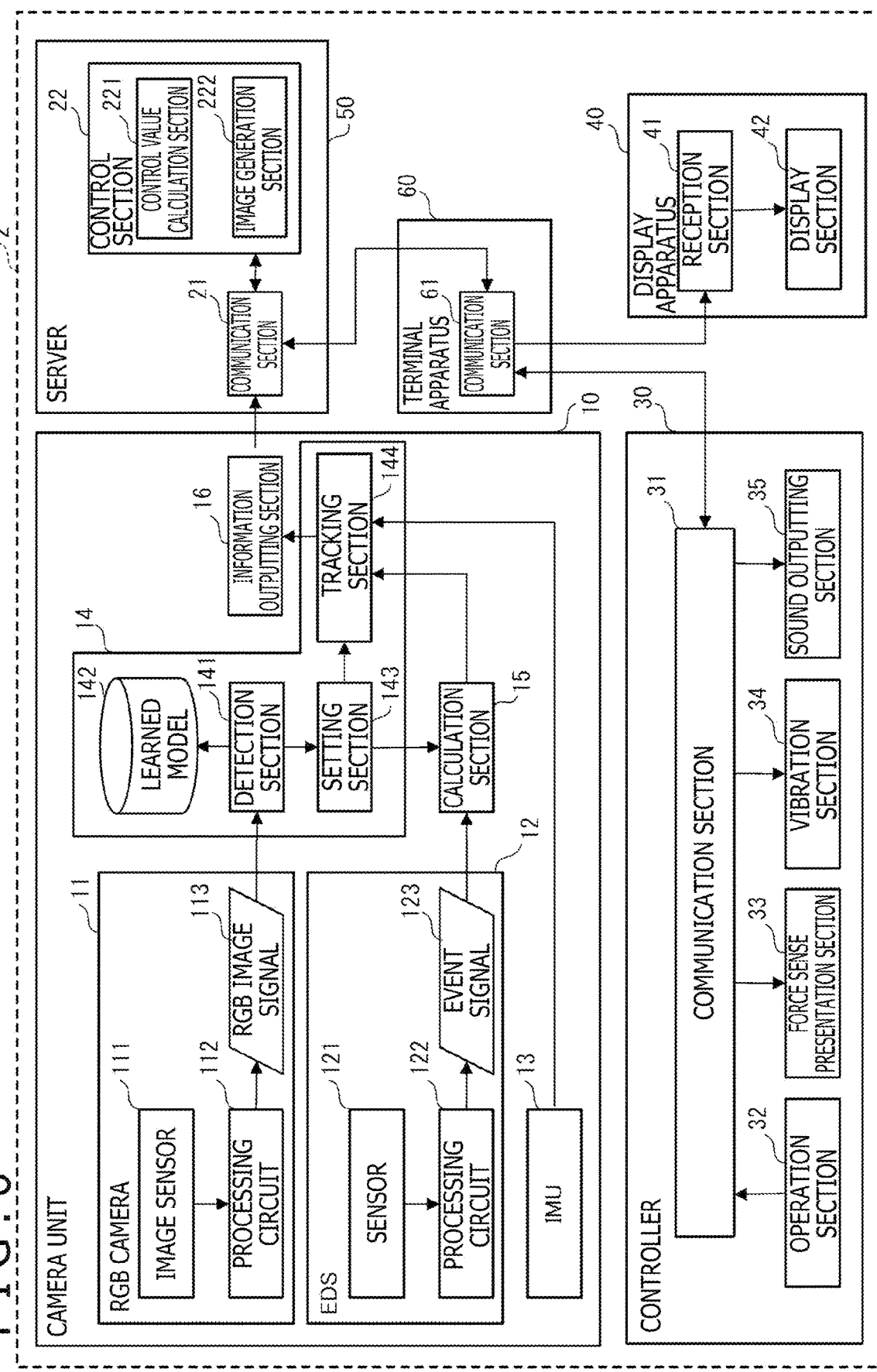

INFORMATION PROCESSING APPARATUS, SYSTEM, INFORMATION PROCESSING METHOD, AND INFORMATION PROCESSING PROGRAM

TECHNICAL FIELD

The present invention relates to an information processing apparatus, a system, an information processing method, and an information processing program.

BACKGROUND ART

A vision sensor of the event driven type is known in which a pixel that detects an intensity change of incident light generates a signal in a time-asynchronous manner. The vision sensor of the event driven type is advantageous in that it is operable at a high speed with low power in comparison with a vision sensor of the frame type in which all pixels are scanned at predetermined intervals, particularly with an image sensor such as a charge-coupled device (CCD) image sensor or a complementary metal oxide semiconductor (CMOS) image sensor. Technologies related to such a vision sensor of the event driven type as just described are disclosed, for example, in PTL 1 and PTL 2.

CITATION LIST

Patent Literature

[PTL 1] JP-T-2014-535098
[PTL 2] JP-A-2018-085725

SUMMARY

Technical Problem

However, although such an advantage as described above is known in regard to vision sensors of the event driven type, utilization methods in which they are combined with some other apparatuses have not been proposed sufficiently as yet.

Therefore, it is an object of the present invention to provide an information processing apparatus, a system, an information processing method, and an information processing program by which tracking can be performed with a high degree of accuracy while the latency is suppressed by controlling validity or invalidity of tracking on the basis of an image signal generated by a vision sensor of the event driven type.

Solution to Problem

According to an aspect of the present invention, there is provided an information processing apparatus including a detection section that detects a detection target on the basis of a first image signal generated by a first image sensor, a setting section that sets an area of interest in which at least part of the detection target is included, a calculation section that calculates, on the basis of a second image signal generated by a second image sensor that includes a vision sensor of an event driven type that asynchronously generates an image signal when a change in intensity of light incident on each of pixels is detected, a distribution of the second image signal in the area of interest, a tracking section that tracks the detection target in the area of interest on the basis of at least one of the first image signal and the second image signal, a tracking controlling section that decides presence or absence of a movement of the detection target in the area of interest on the basis of the distribution and controls validity or invalidity of the tracking by the tracking section, and an information outputting section that outputs a result of the tracking by the tracking section.

According to another aspect of the present invention, there is provided a system including a first image sensor that generates a first image signal, a second image sensor that includes a vision sensor of an event driven type that asynchronously generates a second image signal when a change in intensity of light incident on each of pixels is detected, a detection section that detects a detection target on the basis of the first image signal, a setting section that sets an area of interest in which at least part of the detection target is included, a calculation section that calculates a distribution of the second image signal in the area of interest on the basis of the second image signal, a tracking section that tracks the detection target in the area of interest on the basis of at least one of the first image signal and the second image signal, a tracking controlling section that decides presence or absence of a movement of the detection target in the area of interest on the basis of the distribution and controls validity or invalidity of the tracking by the tracking section, an information outputting section that outputs a result of the tracking by the tracking section, and an information processing apparatus that includes a reception section that receives the result of the tracking and a control value calculation section that calculates a control value for feedback control to an external apparatus on the basis of the result of the tracking.

According to a further aspect of the present invention, there is provided an information processing method including a first reception step of receiving a first image signal generated by a first image sensor, a second reception step of receiving a second image signal generated by a second image sensor that includes a vision sensor of an event driven type that asynchronously generates an image signal when a change in intensity of light incident on each of pixels is detected, a detection step of detecting a detection target on the basis of the first image signal, a setting step of setting an area of interest in which at least part of the detection target is included, a calculation step of calculating a distribution of the second image signal in the area of interest, a tracking step of performing tracking for the detection target in the area of interest on the basis of at least one of the first image signal and the second image signal, a tracking controlling step of deciding presence or absence of a movement of the detection target in the area of interest on the basis of the distribution and controlling validity or invalidity of the tracking, and an information outputting step of outputting a result of the tracking.

According to a still further aspect of the present invention, there is provided an information processing program for causing a computer to implement a function for receiving a first image signal generated by a first image sensor, a function for receiving a second image signal generated by a second image sensor that includes a vision sensor of an event driven type that asynchronously generates an image signal when a change in intensity of light incident on each of pixels is detected, a function for detecting a detection target on the basis of the first image signal, a function for setting an area of interest in which at least part of the detection target is included, a function for calculating a distribution of the second image signal in the area of interest, a function for performing tracking for the detection target in the area of interest on the basis of at least one of the first image signal and the second image signal, a function for deciding presence or absence of a movement of the detection target in the area of interest on the basis of the distribution and controlling validity or invalidity of the tracking, and a function for outputting a result of the tracking.

According to the configurations described above, by controlling validity or invalidity of tracking on the basis of the image signal generated by the vision sensor of the event driven type, tracking can be performed with a high degree of accuracy while the latency is suppressed.

BRIEF DESCRIPTION OF DRAWINGS

FIG. 6 is a block diagram depicting a general configuration of a system according to another embodiment of the present invention.

DESCRIPTION OF EMBODIMENT

In the following, several embodiments of the present invention are described in detail with reference to the accompanying drawings. It is to be noted that, in the present specification and the drawings, components having substantially the same functional configuration are denoted by the same reference sign, and overlapping description of them is omitted herein.

Figure 1:
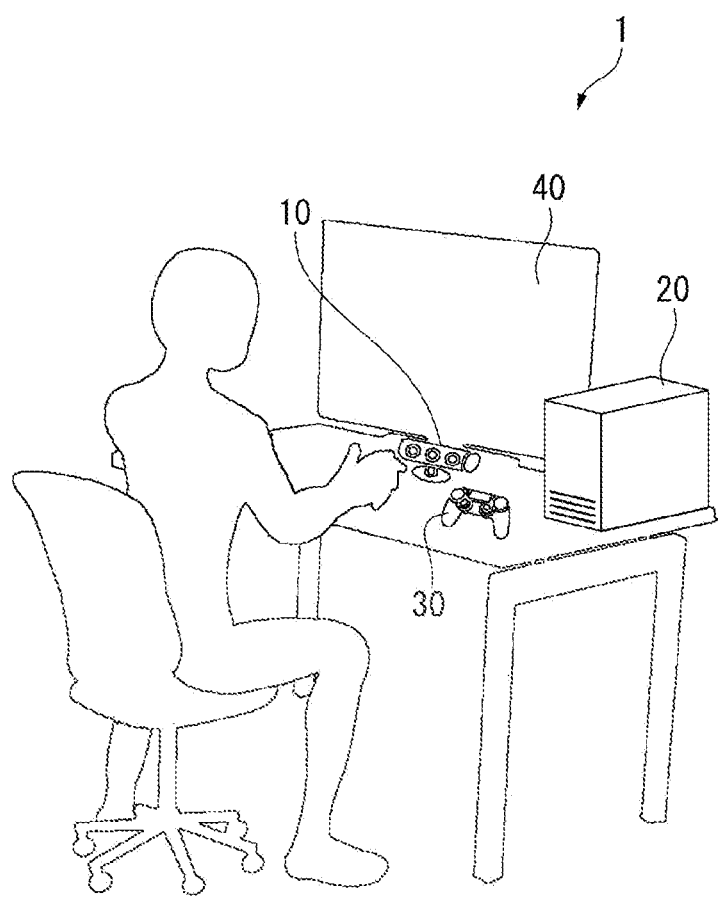
FIG. 1 is a schematic view depicting an entire system according to an embodiment of the present invention.

FIG. 1 is a schematic view depicting an entire system 1 according to an embodiment. The system 1 according to the present embodiment is a game system that includes a camera unit an information processing apparatus 20, a controller 30, and a display apparatus 40 as depicted in FIG. 1. The information processing apparatus 20 is connected to each of the camera unit 10, the controller 30, and the display apparatus 40 by a wired or wireless network. In the system 1, the information processing apparatus 20 proceeds with a game according to information transmitted thereto from the camera unit 10 and the controller 30, and the display apparatus 40 displays an execution-time screen image of the information processing apparatus 20, for example, a game screen image.

In the present embodiment, the camera unit 10 determines a user who is a player of the game as a detection target, and performs tracking of at least one of joints of the user and then transmits a result of the tracking to the information processing apparatus 20. Here, the camera unit can estimate a state of the user by performing tracking of at least one of the posture of the user, the shape of the arms of the user, the shape of the fingers of the user, and the posture of an external apparatus such as the controller 30 that is worn or held by the user. The camera unit 10 functions as an operation apparatus for receiving a user operation, as with the controller 30, by performing tracking of the user as a detection target. Such a camera unit 10 is disposed at a position at which the user is included in the field of view thereof, for example, at a distance of approximately one meter from the user, in order to perform tracking using the user as a detection target. In the example of FIG. 1, the camera unit 10 is disposed in the neighborhood of the display apparatus 40. The optimum disposition position of the camera unit 10 depends upon its object. It is desired to dispose the camera unit 10 at a position at which a target to be grasped such as the overall body, the upper body, or a hand of the user is included in the field of view, according, for example, to contents of the game to be played. It is to be noted that, upon disposition of the camera unit 10, it is preferable that the user is guided to dispose the camera unit 10 at an appropriate position, for example, by the information processing apparatus 20 displaying a tutorial or the like on the display apparatus 40.

Figure 2:
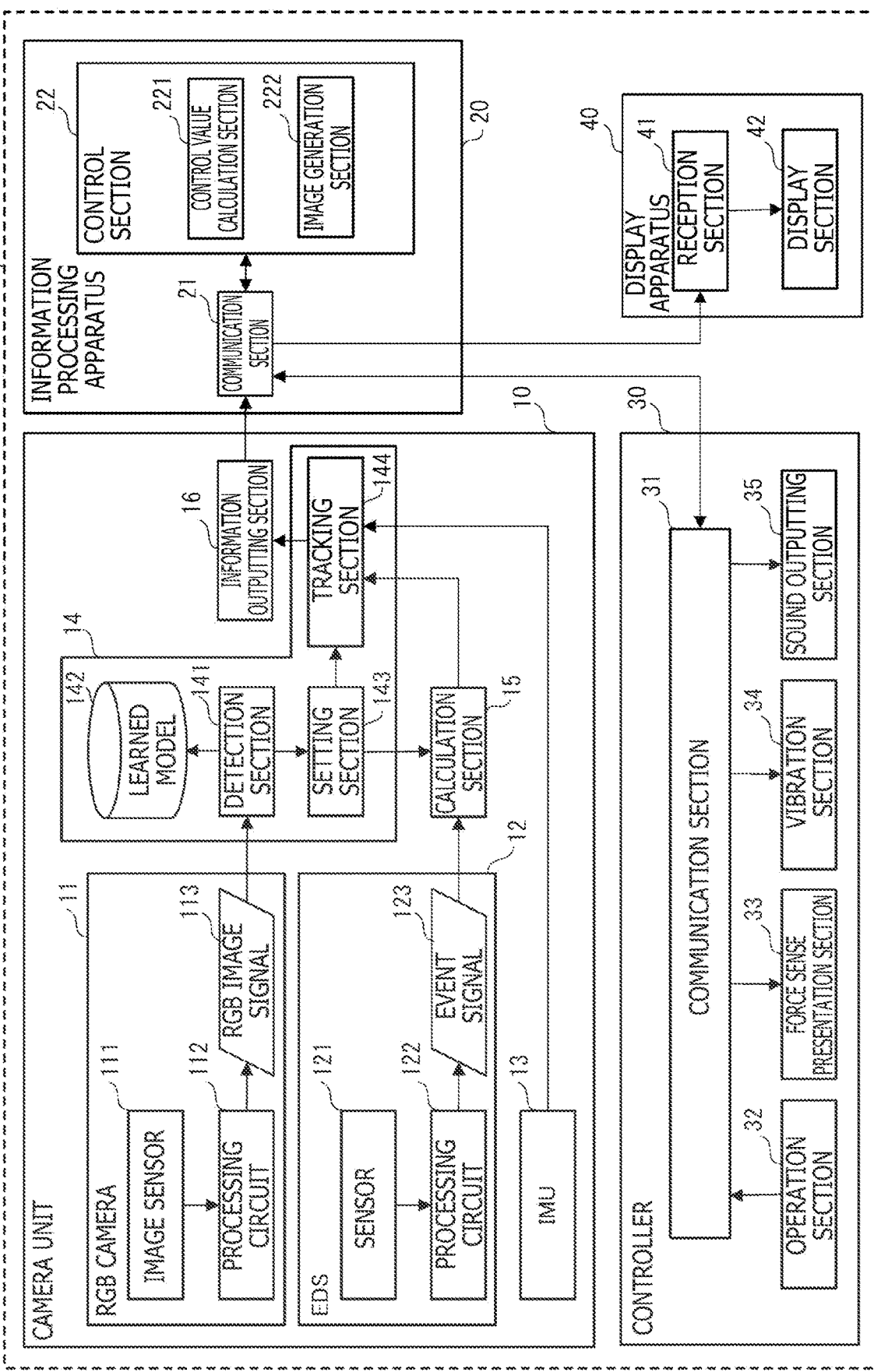
FIG. 2 is a block diagram depicting a general configuration of the system according to the embodiment of the present invention.

In the following, the components of the system 1 are described. FIG. 2 is a block diagram depicting a general configuration of the system according to the embodiment of the present invention. The camera unit 10 includes an RGB camera 11, an event driven sensor (EDS) 12, an inertial measurement unit (IMU) 13, an estimation section 14, a calculation section 15, and an information outputting section 16. The RGB camera 11 includes an image sensor 111 that is a first image sensor, and a processing circuit 112 connected to the image sensor 111. The image sensor 111 generates an RGB image signal 113 by synchronously scanning all pixels, for example, at a predetermined cycle or at a predetermined timing according to a user operation. The processing circuit 112, for example, converts the RGB image signal 113 so as to have a format suitable for storage and transmission. Further, the processing circuit 112 gives a timestamp to the RGB image signal 113.

The EDS 12 includes a sensor 121 that is a second image sensor configuring a sensor array, and a processing circuit 122 connected to the sensor 121. The sensor 121 is a vision sensor of the event driven type that includes light receiving elements and generates an event signal 123 when it detects an intensity change of light incident on each pixel, more particularly, when it detects a luminance change that exceeds a predetermined value determined in advance. The event signal 123 that is outputted via the processing circuit 122 includes identification information of the sensor 121 (for example, a position of a pixel), the polarity (increase or decrease) of the luminance change, and a timestamp. Further, when a luminance change is detected, the EDS 12 can generate an event signal 123 with a frequency much higher than the generation frequency of the RGB image signal 113 (frame rate of the RGB camera 11). Further, the EDS 12 can generate the event signal 123 with a frequency much higher than the generation frequency of the RGB image signal 113 (frame rate of the RGB camera 11). It is to be noted that, in the present specification, a signal that can be the basis for construction of an image is referred to as an image signal. Accordingly, the RGB image signal 113 and the event signal 123 each indicate an example of the image signal.

In the present embodiment, the timestamps given to the RGB image signal 113 and the event signal 123 are in synchronism with each other. In particular, by providing time information, which is to be used in the EDS 12 in order to generate a timestamp, to the RGB camera 11, the timestamps given to the RGB image signal 113 and the event signal 123 can be synchronized with each other. Alternatively, in a case where the time information for generating a timestamp in the RGB camera 11 and that in the EDS 12 are independent from each other, by calculating an offset amount of the timestamp with reference to a point of time at which a specific event (for example, a change of the imaging target over an overall image) occurs, the timestamps given to the RGB image signal 113 and the event signal 123 can be synchronized with each other ex post.

Further, in the present embodiment, by a calibration procedure for the RGB camera 11 and the EDS 12 executed beforehand, the sensor 121 of the EDS 12 is associated with one or a plurality of pixels of the RGB image signal 113, and the event signal 123 is generated according to an intensity change of light at the one or plurality of pixels of the RGB image signal 113. More particularly, for example, by causing the RGB camera 11 and the EDS 12 to capture an image of a common calibration pattern and calculating correspondence parameters between the camera and the sensor from internal parameters and external parameters of each of the RGB camera 11 and the EDS 12, the sensor 121 can be associated with the one or plurality of pixels of the RGB image signal 113.

The IMU 13 is a sensor that detects the posture of the camera unit 10 itself. The IMU 13 acquires three-dimensional posture data of the camera unit 10 in a predetermined cycle or at a predetermined timing and outputs the three-dimensional posture data to the estimation section 14.

Figure 3:
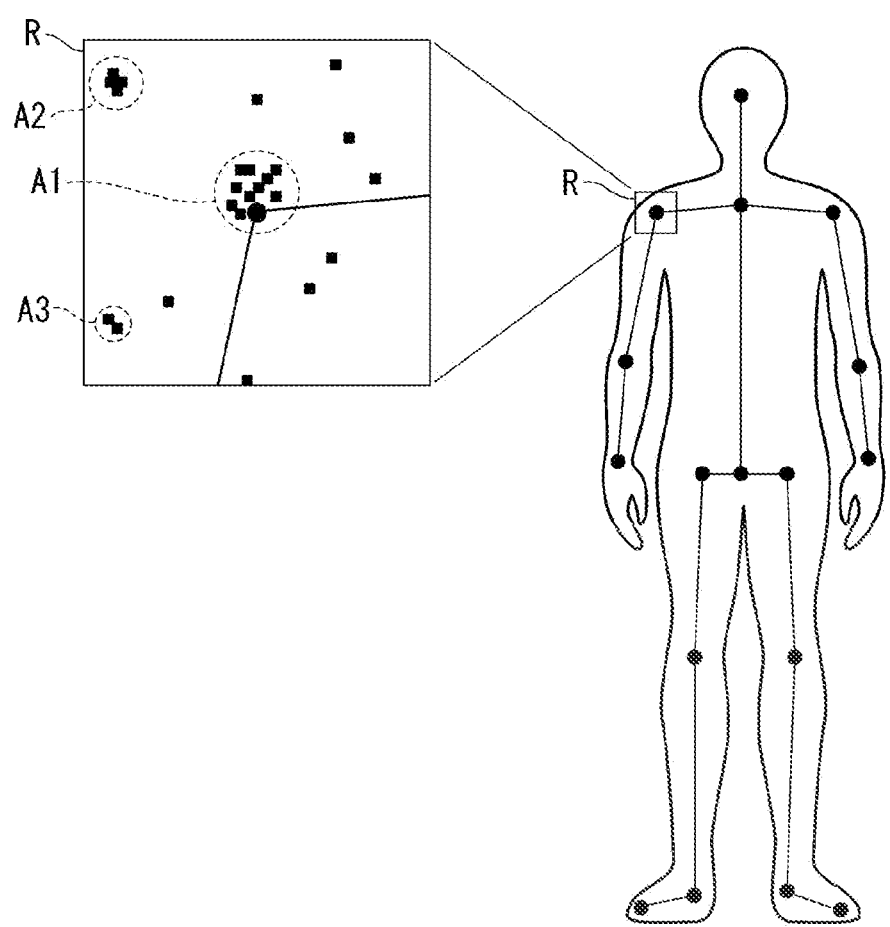
FIG. 3 is a view illustrating an example of detection of a person in the embodiment of the present invention.

The estimation section 14 performs tracking determining the user as a detection target from the RGB image signal 113 generated by the RGB camera 11. As depicted in FIG. 2, the estimation section 14 includes a detection section 141, a learned model 142, a setting section 143, and a tracking section 144. The detection section 141 detects a detection target on the basis of the RGB image signal 113 generated by the image sensor 111 that is the first image sensor. The present embodiment is described taking a case in which the detection target is a person, as an example. The detection section 141 calculates coordinate information of at least one joint of the person who is the detection target. FIG. 3 is a view illustrating an example of detection of the person. The detection section 141 calculates coordinate information of a plurality of joints of the person as depicted in FIG. 3. In the example of FIG. 3, an example is depicted in which coordinate information of 17 joints including the head, the shoulders, the elbows, the wrists, the knees, the ankles, the tiptoes, and so forth is calculated. The detection section 141 calculates coordinate information indicative of the positions of the plurality of joints the user has from the RGB image signal 113, for example, on the basis of the learned model 142. The learned model 142 can be constructed in advance, for example, by executing supervised learning in which an image of a person having a plurality of joints is used as input data and coordinate information indicative of the positions of the plurality of joints of the person is used as correct answer data. It is to be noted that detailed description of a particular technique for machine learning is omitted herein because various known technologies therefor are available. Further, the detection section 141 of the estimation section 14 may include a relation learning section such that, every time the RGB image signal 113 is inputted, the relation between the image based on the inputted RGB image signal 113 and the coordinate information indicative of the positions of the joints is learned to update the learned model 142.

Further, upon processing by the detection section 141, the event signal 123 may be used. For example, coordinate information of at least one joint of the person of the detection target may be calculated on the basis only of the event signal 123. Alternatively, for example, on the basis of the RGB image signal 113 and the event signal 123, an object existing in continuous pixel regions in which it is indicated that events of the same polarity occur may first be detected as a person in the event signal 123, and then the detection process described above may be performed for the corresponding portion of the RGB image signal 113.

The setting section 143 of the estimation section 14 sets an area of interest in which at least part of the detection target is included. The area of interest is an area in which at least part of the detection target is included, and is a noticed area that becomes a target of tracking hereinafter described. For example, the setting section 143 sets, for each of the joints of the person detected by the detection section 141, a square of a predetermined size centered at the joint as an area R of interest as depicted in FIG. 3. It is to be noted that, although, in the example of FIG. 3, only one of the joints of the shoulders is depicted as the area R of interest, the setting section 143 may otherwise set an area R of interest for all the joints of the person detected by the detection section 141 or may set an area R of interest for only some of the joints. It may be made possible for the user to designate to which one or ones of the joints an area R of interest is to be set.

The tracking section 144 of the estimation section 14 tracks the detection target in the area R of interest set by the setting section 143, on the basis of the RGB image signal 113. The tracking section 144 may perform the tracking at a timing at which the RGB image signal 113 is generated (frame rate of the RGB camera 11) or may perform the tracking at a predetermined cycle or at a predetermined timing. It is to be noted that, in a case where a plurality of areas R of interest are set by the setting section 143, the tracking section 144 performs tracking for each of the areas R of interest. Further, after an area R of interest is set once by the setting section 143, the setting of an area R of interest by the setting section 143 may be skipped while tracking by the tracking section 144 is performed. In this case, by performing re-setting of an area R of interest by the setting section 143 at a predetermined timing, more factual tracking can be performed. A result of the tracking by the tracking section 144 is outputted to the information outputting section 16.

Further, the event signal 123 may be used upon tracking by the tracking section 144. For example, tracking of the detection target in the area R of interest may be performed on the basis only of the event signal 123. Alternatively, for example, tracking may be performed on the basis of both the RGB image signal 113 and the event signal 123, or tracking based on the RGB image signal 113 and tracking based on the event signal 123 may be switched in response to a movement of the detection target or the like such that results of the two different tracking operations are used complementarily.

As described so far, the estimation section 14 can estimate the state of the user by calculating coordinate information on the basis of the RGB image signal 113 and performing tracking. Accordingly, by estimating the state of the user, the camera unit 10 functions as an operation apparatus for receiving a user operation, as with the controller 30. In other words, the camera unit 10 can identify a user operation on the basis of the state of the user estimated by the estimation section 14.

It is to be noted that, when coordinate information is calculated by the detection section 141, three-dimensional posture data of the camera unit 10 detected by the IMU 13 may be used. For example, when any of calculation of coordinate information based on the RGB image signal 113, calculation of coordinate information based on the event signal 123, and calculation of coordinate information based on the RGB image signal 113 and the event signal 123 is performed, three-dimensional posture data detected by the IMU 13 may be used. Further, when tracking is performed by the tracking section 144, three-dimensional posture data of the camera unit 10 detected by the IMU 13 may be used. For example, when any of tracking based on the RGB image signal 113, tracking based on the event signal 123, and tracking based on the RGB image signal 113 and the event signal 123 is performed, three-dimensional posture data detected by the IMU 13 may be used.

Figure 4A:
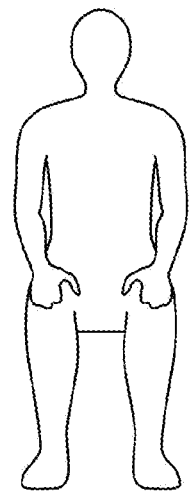
FIG. 4A is a view illustrating an example of estimation of a state of a person in the embodiment of the present invention.
Figure 4B:
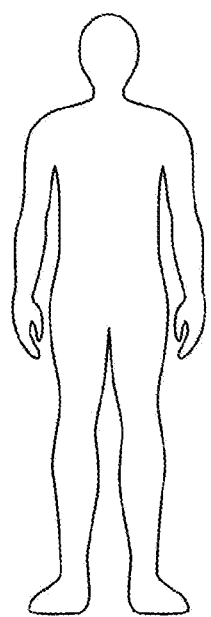
FIG. 4B is a view illustrating another example of estimation of a state of a person in the embodiment of the present invention.
Figure 4C:
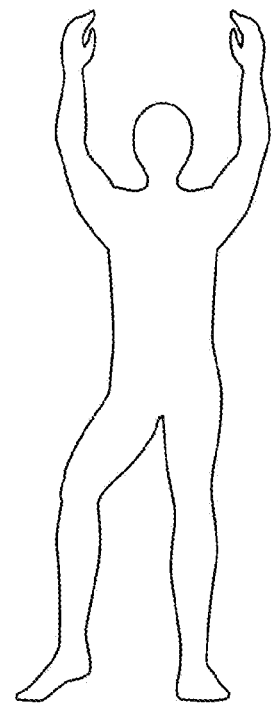
FIG. 4C is a view illustrating a further example of estimation of a state of a person in the embodiment of the present invention.
Figure 4D:
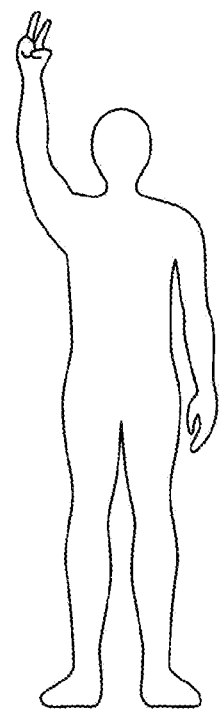
FIG. 4D is a view illustrating a still further example of estimation of a state of a person in the embodiment of the present invention.
Figure 4E:
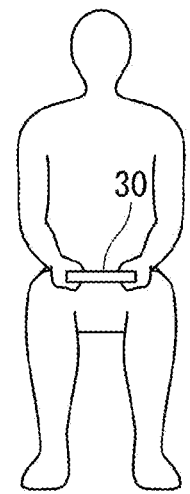
FIG. 4E is a view illustrating a yet further example of estimation of a state of a person in the embodiment of the present invention.

The state of the user estimated by the estimation section 14 includes at least one of the posture of the user, the shape of the arms of the user, the shape of the fingers of the user, and the posture of an external apparatus such as the controller 30 worn or held by the user, as described hereinabove. FIGS. 4A to 4E are views illustrating examples of estimation of the state of the user. The posture of the user includes, for example, a state in which the user is sitting in a chair or the like as depicted in FIG. 4A, another state in which the user is standing as depicted in FIG. 4B, a further state in which the user faces the camera unit 10, a still further state in which the user faces sideways, and so forth. Further, the shape of the arms of the user includes, for example, a state in which the user has the arms raised as depicted in FIG. 4C, another state in which the user moves the arms to take a predetermined pose, and so forth. Further, the shape of the fingers of the user includes, for example, a state in which the user moves the fingers to take a predetermined pose such as putting up two fingers to make a V sign as depicted in FIG. 4D, and so forth. Further, the posture of an external apparatus such as the controller 30 worn or held by the user includes, for example, a state in which the user grips the controller 30 as depicted in FIG. 4E, the posture of the controller 30 itself gripped by the user, and so forth.

The calculation section 15 calculates a distribution of the detection target in an area R of interest set by the setting section 143, on the basis of the event signal 123 generated by the sensor 121 that is a second image sensor. In the EDS 12, a luminance change occurs in a case where the posture or position of the user changes within the field of view or in a like case, and an event signal 123 is generated by the sensor 121 at a pixel address at which the luminance change occurs. Accordingly, the position itself of the event signal 123 in an area corresponding to the area R of interest set by the setting section 143 corresponds to the coordinate information of the detection target. However, the event signal 123 generated by the EDS 12 is apt to be influenced by a change in ambient brightness. For example, in the example of FIG. 3, in the area R of interest set for the joint of one of the shoulders, event signals 123 are generated not only in an area A1 centered at the joint, and event signals 123 are generated also in an area A2 and another area A3 spaced from the joint, and besides, event signals 123 of noise are generated.

Therefore, the calculation section 15 calculates a distribution of the detection target, taking characteristics of the event signals 123 into consideration. For example, the calculation section 15 calculates a distribution of the detection target by performing a weighting process based on the number of event signals 123 included in the area R of interest, the distances from the center of the area R of interest to the respective event signals 123, and so forth. The distribution of the detection target calculated in this manner corresponds to a movement of the detection target in the area R of interest. It is to be noted that, when the distribution is calculated, the calculation section 15 may calculate it based on a logarithmic scale. By calculating the distribution in this manner, a distribution in which the influence of changes in ambient brightness is suppressed can be calculated. Especially, by calculating the distribution based on a logarithmic scale, even in a dark scene in which the EDS 12 works poorly, an accurate distribution can be calculated.

Then, the estimation section 14 decides whether or not there is a movement of the detection target in the area R of interest, on the basis of the distribution calculated by the calculation section 15, and controls validity or invalidity of the tracking by the tracking section 144. The case in which there is a movement of the detection target refers to a state in which it can be decided that the user is not stationary. In such a case, since there is the possibility that some user operation may have been performed via the camera unit 10, the estimation section 14 determines that the tracking by the tracking section 144 is valid. On the other hand, the case in which there is no movement of the detection target refers to a state in which it can be decided that the user is stationary. In the above-described estimation of the state of the user by the estimation section 14, even in a case where the user is stationary, an unintentional variation that the state of the user estimated by the estimation section 14 changes sometimes occurs. This arises from that, in a case where it is tried to achieve a latency demanded in a game system, in an estimation process based on the RGB image signal 113, the image size is reduced from that of the original RGB image signal 113 through convolution calculation and so forth, resulting in a decrease of the spatial resolution or the like. In order to prevent such an unintentional variation, it is possible to perform, as a process subsequent to the estimation process, a filter process or the like to achieve stabilization. However, this gives rise to another problem such as deterioration of the latency or an increase of the processing load. Hence, in a case where the detection target does not indicate any movement and it can be decided that the user is stationary, since it is considered that the estimation result by the estimation section 14 does not have a significant change, the estimation section 14 determines that the tracking by the tracking section 144 is invalid. By performing the estimation of the state of the user while focusing on the timing at which it is considered that the tracking by the tracking section 144 is valid, in this manner, the tracking can be performed with a high degree of accuracy without deteriorating the latency and without increasing the processing load.

It is to be noted that the control of validity or invalidity of the tracking by the tracking section 144 may be performed in any manner. For example, when the tracking is valid, processing for the tracking by the tracking section 144 may be executed, but when the tracking is invalid, processing for the tracking by the tracking section 144 may be stopped. Further, for example, when the tracking is valid, outputting of a tracking result from the tracking section 144 to the information outputting section 16 may be performed, but when the tracking is invalid, outputting of a tracking result from the tracking section 144 to the information outputting section 16 may be stopped.

The information outputting section 16 outputs information indicative of the state of the user estimated by the estimation section 14 to the information processing apparatus 20. It is to be noted that this information may be coordinate information calculated by the detection section 141, may be a result of tracking by the tracking section 144, or may be information indicative of the state of the user estimated on the basis of the result of tracking by the tracking section 144. Further, a relation between a state of the user and a user operation may be defined in a table in advance such that the information outputting section 16 outputs information indicative of a user operation as the information indicating the state, to the information processing apparatus 20.

As described so far, the camera unit 10 can solely complete the processes from the generation of an RGB image signal 113 and an event signal 123 to the estimation of a state of a person and can output information indicative of the estimated state, without outputting the RGB image signal 113 and the event signal 123, to the information processing apparatus 20. It is to be noted that the camera unit 10 preferably has an independent power supply.

Referring again to FIG. 2, the information processing apparatus 20 is implemented, for example, by a computer that includes a communication interface, a processor, and a memory, and includes a communication section 21 and a control section 22. The control section 22 includes functions of a control value calculation section 221 and an image generation section 222 that are implemented by operation of the processor in accordance with a program stored in the memory or received via the communication interface. In the following, the functions of the sections mentioned are described further.

The communication section 21 receives information outputted from the information outputting section 16 of the camera unit 10. Further, the communication section 21 can establish mutual communication with the controller 30 and outputs an image to be displayed on the display apparatus 40. The control value calculation section 221 of the control section 22 calculates a control value for feedback control to external apparatuses including the controller 30 and the display apparatus 40, on the basis of at least one of the information received from the information outputting section 16 of the camera unit 10 and information received from the controller 30. As described hereinabove, the camera unit 10 and the controller 30 each function as an operation apparatus for receiving a user operation. Therefore, the control value calculation section 221 calculates control values for feedback control to the external apparatuses including the controller 30 and the display apparatus 40, in response to a user operation performed through at least one of the camera unit 10 and the controller 30. The calculated control values are outputted to the controller 30 and the display apparatus 40 via the communication section 21. The image generation section 222 of the control section 22 generates a display image to be displayed on the display apparatus 40, according to the control values calculated by the control value calculation section 221. The generated display image is outputted to the display apparatus 40 via the communication section 21. It is to be noted that details of the calculation of control values and the generation of a display image are hereinafter described in connection with description of the configurations of the controller 30 and the display apparatus 40 hereinafter described.

The controller 30 includes a communication section 31, an operation section 32, a force sense presentation section 33, a vibration section 34, and a sound outputting section 35 as depicted in FIG. 2. The user can perform various operations for a game by operating the controller 30. The communication section 31 receives control values outputted from the communication section 21 of the information processing apparatus 20 and outputs them to the force sense presentation section 33, the vibration section 34, and the sound outputting section 35. Further, the communication section 31 outputs information related to a user operation received by the operation section 32 to the information processing apparatus 20. The operation section 32 includes a plurality of operation elements such as a button and a pad and receives an operation input performed by the user on the operation elements. The force sense presentation section 33 is provided to at least some of the operation elements of the operation section 32 and presents a force against or linked to a user operation to the user, according to a control value supplied from the information processing apparatus 20. In particular, the force sense presentation section 33 can be configured from a motor, an actuator, or the like including a rotor. Since the force sense presentation device configuring the force sense presentation section 33 can be configured adopting a widely known force sense presentation device, detailed description of it is omitted here.

The vibration section 34 generates vibration according to a control value supplied thereto from the information processing apparatus 20 and can be configured, for example, from a motor. When a user operation is performed, the vibration section 34 can generate vibration to notify the user of that the user operation has been performed properly and recognized by the information processing apparatus 20. The sound outputting section 35 outputs sound according to a control value supplied thereto from the information processing apparatus 20 and can be configured, for example, from a speaker. When a user operation is performed, the sound outputting section 35 can output sound to notify the user of that the user operation has been performed properly and recognized by the information processing apparatus 20. It is to be noted that, if at least one of vibration by the vibration section 34 and sound outputting by the sound outputting section 35 is performed in conjunction with presentation of a force sense by the force sense presentation section 33 described above, then diversity of feedback control to the user can be enhanced.

The control value calculation section 221 of the information processing apparatus 20 calculates control values for feedback control to the controller 30 as described hereinabove. More particularly, it calculates control values for feedback control to the force sense presentation section 33, the vibration section 34, and the sound outputting section 35 of the controller 30. For the force sense presentation section 33, the control value calculation section 221 calculates a control value indicative of what force sense is to be presented as the feedback control in response to a user operation. For the vibration section 34, the control value calculation section 221 calculates a control value indicative of what vibration is to be generated as the feedback control in response to a user operation. For the sound outputting section 35, the control value calculation section 221 calculates a control value indicative of what sound is to be outputted as the feedback control in response to a user operation. The calculation of the control values by the control value calculation section 221 can be performed according to a calculation formula determined in advance, a table, or the like.

It is to be noted that, to the controller 30 described so far, it is possible to apply various known configurations. For example, the controller 30 may be configured from a pair of controllers that can be gripped individually by both hands, may be configured from a controller capable of receiving inputs of characters such as a keyboard, or may be configured from an application of a smartphone or the like. Further, the controller 30 may include a sound inputting section, and a speech recognition technology may be applied. For example, the controller 30 may include a sound inputting section such as a microphone and a speech recognition section such that information indicative of a command uttered by the user, calling by the user, or the like is supplied to the information processing apparatus 20 via the communication section 31.

The display apparatus 40 includes a reception section 41 and a display section 42 as depicted in FIG. 2. The reception section 41 receives information indicative of a display image generated by the image generation section 222 of the information processing apparatus 20, via the communication section 21. The display section 42 includes a monitor such as a liquid crystal display (LCD) monitor or an organic electroluminescence (EL) monitor and can display a display image on the basis of the information received by the reception section 41 to present the display image to the user.

It is to be noted that various known configurations can be applied to the display apparatus described above. For example, the display apparatus 40 may be configured from a display apparatus for exclusive use as depicted in FIG. 1, may be configured from a display apparatus such as an head-mounted display (HMD) to be mounted on the head of the user, may be configured from a display apparatus of a computer, or may be configured from a display apparatus of a terminal apparatus such as a smartphone. Further, the display apparatus 40 may include a touch panel that detects a touch therewith on a surface of the display section 42.

The control value calculation section 221 of the information processing apparatus 20 calculates a control value for feedback control to a display image to be displayed on the display apparatus 40 as described hereinabove. More particularly, the control value calculation section 221 calculates a control value indicative of in what manner the display image is to be changed as the feedback control in response to a user operation. The calculation of the control value by the control value calculation section 221 can be performed according to a calculation formula determined in advance, a table, or the like.

The image generation section 222 of the information processing apparatus 20 generates a display image to be displayed on the display apparatus 40, according to the control value calculated by the control value calculation section 221 as described hereinabove. More particularly, the image generation section 222 generates a display image to be newly displayed on the display apparatus according to the control value for changing the display image. It is to be noted that the state of the user estimated by the camera unit 10 is reflected on the generation of the display image. Therefore, for example, in a case where the user is stationary in fact, the display image to be generated indicates a small change or no change, and in a case where a user operation is performed, the display image to be generated is an image that indicates a change in response to the user operation. By such a configuration, it is possible to suppress occurrence of unintentional variations of a display image and stabilize contents of drawing in the display apparatus 40.

Figure 5:
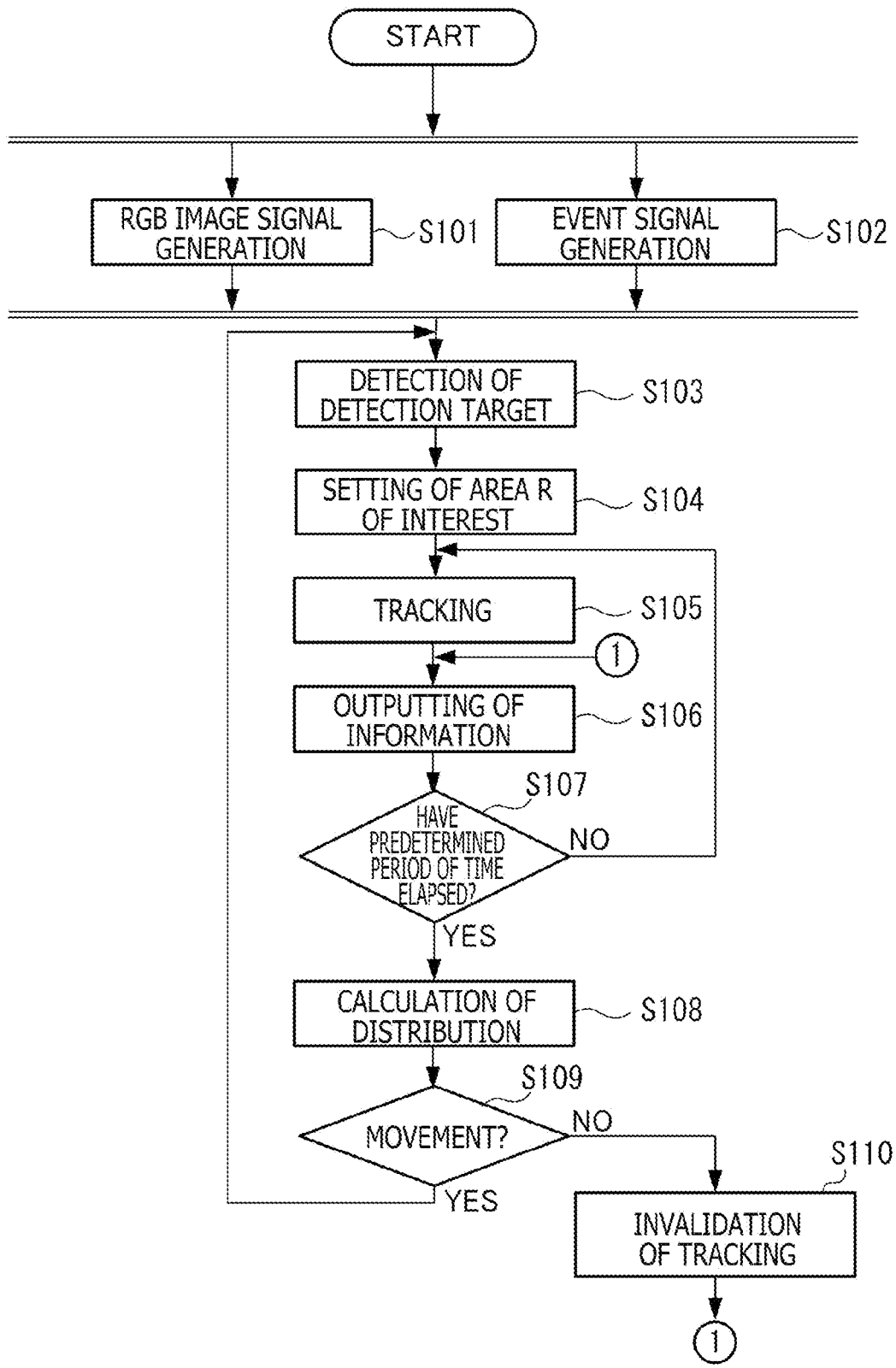
FIG. 5 is a flow chart depicting an example of a processing method according to the embodiment of the present invention.

FIG. 5 is a flow chart depicting an example of processing of the camera unit 10 according to the embodiment of the present invention. In the example depicted, the image sensor 111 of the RGB camera 11 generates an RGB image signal 113 (step S101), and the sensor 121 of the EDS 12 generates an event signal 123 (step S102). Then, the detection section 141 of the estimation section 14 detects a detection target from the RGB image signal 113 (step S103), and the setting section 143 sets an area R of interest (step S104). The tracking section 144 tracks the detection target in the area R of interest on the basis of the RGB image signal 113 (step S105), and the information outputting section 16 outputs a result of the tracking (step S106).

The estimation section 14 repeats step S105 and step S106 until a predetermined period of time elapses, and when the predetermined period of time has elapsed (YES in step S107), the calculation section 15 calculates a distribution on the basis of the event signal 123 (step S108). Then, the tracking section 144 decides, on the basis of the calculated distribution, whether or not there is a movement of the detection target, and in a case where the tracking section 144 decides that there is a movement (YES in step S109), the processing returns to step S103, and the estimation section 14 again executes the processes in the steps beginning with step S103 (although also the processes from step S101 to step S102 are repeated, they may not necessarily be performed in a cycle same as that of the processes in the steps beginning with step S103) to continue the tracking.

The case in which there is a movement of the detection target refers to a case in which it can be decided that the user is not stationary, and also refers to a case in which it is considered that there is the possibility that some user operation might have been performed via the camera unit 10. Accordingly, in such a case as just described, by performing the processes by the estimation section 14 to estimate the state of the user from the RGB image signal 113, the latest state of the user can be grasped.

On the other hand, in a case where there is no movement of the detection target (NO in step S109), the tracking section 144 invalidates the tracking (step S110). It is to be noted that, for the invalidation of the tracking, the processes for tracking by the tracking section 144 may be stopped, or outputting of a tracking result from the tracking section 144 to the information outputting section 16 may be stopped, as described hereinabove. The case in which there is no movement of the detection target refers to a case in which it can be decided that the user is stationary, and also refers to a case in which it is considered that a user operation has not been performed via the camera unit 10. Accordingly, in such a case as just described, by avoiding unnecessary estimation by the estimation section 14, occurrence of such an unintentional variation that, even in a case where the user is stationary, the state of the user estimated by the estimation section 14 changes can be avoided or reduced. Then, the processing returns to step S106, and the information outputting section 16 outputs information indicative of the state of the user. At this time, the information indicative of the state of the user may be the result of the previous tracking in step S105 described above or may be information indicating that "it is estimated that the state of the user has not been changed."

In the embodiment of the present invention as descried above, the detection section 141 detects a detection target on the basis of an RGB image signal 113 generated by the image sensor 111, and the setting section 143 sets an area of interest in which at least part of the detection target is included. Further, the calculation section 15 calculates, on the basis of event signals 123 generated by the sensor 121, a distribution of the event signals 123 in the area of interest, and the tracking section 144 tracks the detection target in the area of interest on the basis of the RGB image signal 113 or the event signals 123. Then, the tracking section 144 decides on the basis of the distribution whether or not there is a movement of the detection target in the area of interest such that validity or invalidity of the tracking by the tracking section 144 is controlled, and the information outputting section 16 outputs a result of the tracking. Accordingly, in a case where a user operation via the camera unit 10 is performed, the tracking is validated and the state of the user is estimated, but in a case where a user operation is not performed, the tracking is invalidated and it can be avoided that an estimation process whose processing load is heavy is performed. Further, occurrence of such an unintentional variation that, even in a case where the user is stationary in fact, the estimated state of the user changes can be suppressed, and as a result, the state of the person can be estimated while the latency is suppressed. By the configuration as described above, the state of the person can be estimated stably without performing, for example, an additional filter process or the like for preventing unintentional variations from occurring.

Further, the processes from the generation of an RGB image signal 113 and an event signal 123 to the estimation of the state of a person are performed by the camera unit 10, and the camera unit 10 outputs information indicative of the estimated state without outputting the RGB image signal 113 and the event signal 123, so that the problems of the communication load and the communication delay can be reduced. Further, since there is no necessity to output the RGB image signal 113 and the event signal 123, this is advantageous also in terms of privacy protection. Further, in the embodiment of the present invention, the distribution is calculated on the basis of the number of event signals 123 included in the area of interest or the distance from the center of the area of interest to each event signal 123. Therefore, while importance is attached to the movement of the detection target, an accurate distribution can be calculated with an event signal 123, which is generated by an influence of a change in ambient brightness irrespective of the movement of the detection target, and noise removed.

Further, since the camera unit 10 of the embodiment of the present invention can estimate the state of a person and receive a user operation, it does not cause physical fatigue of the user in order to maintain a cursor position as in a conventional operation apparatus of the pointing device type. Further, the camera unit 10 does not require the user to wear a marker or an attachment that becomes a recognition target as in a conventional operation apparatus of the posture detection type.

Further, in the embodiment of the present invention, both the EDS 12 and the RGB camera 11 are provided, and it is grasped on the basis of the event signal 123, which itself corresponds to a distribution and which is comparatively small in time lag, whether or not there is a movement of a detection target. Then, in a case where there is a movement of the detection target, the state of a person is estimated in detail from the RGB image signal 113 that includes a relatively great amount of information. Therefore, preferable processing that makes the most of respective characteristics of the RGB image signal 113 and the event signal 123 can be implemented.

Further, in the embodiment of the present invention, the state of a person estimated by the estimation section 14 includes at least one of the posture of the person, the shape of the arms of the person, the shape of the fingers of the person, and the posture of an external apparatus worn or held by the person. Accordingly, it is possible to estimate a characteristic state of the user and precisely grasp an intention or contents of a user operation.

Further, in the embodiment of the present invention, the estimation section 14 calculates, on the basis of a learned model constructed by learning the relation between an image of a person having a plurality of joints and coordinate information indicative of positions of the plurality of joints, coordinate information of at least one of the joints of the person included in a first image (RGB image) based on the RGB image signal 113 and estimates the state on the basis of the coordinate information. Accordingly, the state of the person can be estimated precisely and fast.

Further, in the embodiment of the present invention, the information processing apparatus is provided which includes the communication section 21 that serves as a reception section that receives information indicative of a state and the control value calculation section 221 that calculates a control value for feedback control to an external apparatus on the basis of the information indicative of the state. Accordingly, it is possible to calculate a control value for feedback control to the external apparatus such as the controller 30 and the display apparatus 40, on the basis of information indicative of the state of the person estimated by the camera unit 10.

Further, in the embodiment of the present invention, the controller 30 includes the force sense presentation section 33 that includes a force sense presentation device that presents a force sense, the vibration section 34 that includes a vibration device, and the sound outputting section that includes a sound outputting device, and the information processing apparatus 20 includes the communication section 21 that serves as a control value outputting section that outputs a control value to the controller 30. The control value calculation section 221 calculates control values for feedback control to the force sense presentation section 33, the vibration section 34, and the sound outputting section 35. Accordingly, it is possible to implement feedback control for the respective sections of the controller 30 according to information indicative of the state of the person estimated by the camera unit 10.

Further, in the embodiment of the present invention, the control value calculation section 221 calculates a control value for feedback control for a display image, and the information processing apparatus 20 includes the image generation section 222 that generates a display image to be displayed on the display apparatus 40, according to the control value. Accordingly, it is possible to implement feedback control for changing the display image to be displayed on the display apparatus 40, according to the information indicative of the state of the person estimated by the camera unit 10.

FIG. 6 is a block diagram depicting a general configuration of a system according to another embodiment of the present invention. It is to be noted that FIG. 6 is a block diagram depicting a configuration of a system 2 that includes a server 50 and a terminal apparatus 60 in place of the information processing apparatus 20 of FIG. 2, and in FIG. 6, components having functional configurations substantially the same as those in FIG. 2 are denoted by the same reference signs.

In the example of FIG. 6, the server 50 is a server (for example, a cloud server) that is connected for communication with the camera unit 10 and the terminal apparatus 60 by an Internet communication network or by wireless communication. The server 50 has a configuration similar to that of the information processing apparatus 20 described hereinabove with reference to FIG. 2 and performs various processes based on information outputted from the camera unit 10. Further, the terminal apparatus 60 includes a communication section 61, and the communication section 61 receives information outputted from the server 50. Further, the communication section 61 can establish mutual communication with the controller 30 as with the communication section 21 of the information processing apparatus 20 described hereinabove with reference to FIG. 2 and outputs an image to be displayed on the display apparatus 40. By such a configuration, the processes from the generation of an RGB image signal 113 and an event signal 123 to the estimation of the state of a person are performed by the camera unit 10, and information indicative of the estimated state is outputted to the server 50. Accordingly, similar advantageous effects can be achieved also by a game system that uses a server such as a cloud server.

It is to be noted that, although the camera unit 10 described in connection with the examples described above indicates an example in which, on the basis of the distribution of the event signal 123 calculated by the calculation section 15, tracking is validated in a case where there is a movement of the detection target, but tracking is invalidated in a case where there is no movement of the detection target, this example is not restrictive. The camera unit 10 may otherwise be configured such that it performs different estimation processes on the basis of a result of comparison between a degree of a movement of a detection target and a threshold value. In this case, for example, it is possible to configure the camera unit 10 such that, in a case where the movement of the detection target is relatively small, the accuracy of the estimation process is increased in order to recognize a fine change in state, but in a case where the movement of the detection target is relatively great, the accuracy of the estimation process is decreased in order to roughly recognize a change in state.

Further, although the estimation section 14 in the camera unit 10 described in connection with the examples described above indicates an example in which it calculates coordinate information indicative of the positions of the plurality of joints that the user has from an RGB image signal 113 with use of a technique for machine learning to estimate the state of the person, the estimation section 14 may otherwise be configured such that the state of a person is estimated using some other technique in place of machine learning or in addition to machine learning. For example, a known technique such as a block matching method or a gradient method may be used to calculate a motion vector from the RGB image signal 113 to estimate the state of a person. Further, the present invention can similarly be applied to tracking in which the detection target is, for example, a predetermined vehicle, a predetermined machine, or a predetermined living being other than a person and tracking in which the detection target is a predetermined marker or the like.

Further, in the examples described above, the numbers of RGB cameras 11 and EDSs 12 may be equal to each other or may be different from each other. Further, the number of RGB cameras 11 and the number of EDSs 12 may individually be one or a plural number. For example, in a case where a plurality of RGB cameras 11 are provided, it is possible to expand the range of the field of view for generating an RGB image signal 113 or to three-dimensionally estimate the state of a person from a plurality of RGB image signals 113. In a case where a plurality of EDSs 12 are provided, for example, it is possible to expand the range of the field of view for generating an event signal 123 or to calculate the amount of a three-dimensional movement of a person on the basis of a plurality of event signals 123.

Further, the camera unit 10 described in connection with the examples described above may be incorporated in a single apparatus or may be incorporated in a distributed manner in a plurality of apparatuses. For example, some of the sensors may be provided independently while the other components are implemented in the main body of the camera unit 10.

Further, the system described in connection with the examples described above may be applied to a wearable type device such as an HMD. In this case, where at least the camera unit 10 is incorporated in an HMD, advantageous effects similar to those of the embodiments described hereinabove can be achieved. Specifically, for example, when the user performs imaging with a first person view through the camera unit 10, in a case where there is a movement of the detection target, tracking is validated to estimate the movement and state of the detection target, but in a case where there is no movement of the detection target, tracking is invalidated to avoid performing an estimation process that involves a heavy processing load. It is to be noted that a display section of the HMD includes, for example, a display element such as an LCD element or an organic EL element and an optical device such as a lens, and the display element may be a transmission type display element or a non-transmission type display element. Further, a wearable type device such as an augmented reality (AR) glass device or a mixed reality (MR) glass device may be used as the HMD.

Although several embodiments of the present invention have been described in detail with reference to the accompanying drawings, the present invention is not restricted to the embodiments. It is apparent that those who have common knowledge in the technical field to which the present invention pertains can conceive of various alterations or modifications within the scope of technical ideas described in the claims, and it is construed that also the alterations and modifications naturally belong to the technical scope of the present invention.

REFERENCE SIGNS LIST 1, 2: System
10: Camera unit
11: RGB camera
12: EDS
13: IMU
14: Estimation section
15: Calculation section
16: Information outputting section
20: Information processing apparatus
21, 31, 61: Communication section
22: Control section
32: Operation section
33: Force sense presentation section
34: Vibration section
35: Sound outputting section
40: Display apparatus
41: Reception section
42: Display section
50: Server
60: Terminal apparatus
111: Image sensor
112, 122: Processing circuit
133: RGB image signal
121: Sensor
123: Event signal
141: Detection section
143: Setting section
144: Tracking section
221: Control value calculation section
222: Image generation section

The invention claimed is:

1. An information processing apparatus comprising:
a detection section that detects a detection target on a basis of a first image signal generated by a first image sensor;
a setting section that sets an area of interest in which at least part of the detection target is included;
a calculation section that calculates, on a basis of a second image signal generated by a second image sensor that includes a vision sensor of an event driven type that asynchronously generates an image signal when a change in intensity of light incident on each of pixels is detected, a distribution of the second image signal in the area of interest, wherein the second image signal is included in a plurality of image signals, and wherein the calculation section calculates the distribution based on at least one of a number of image signals of the plurality of image signals included in the area of interest or a distance from a center of the area of interest to each image signal of the plurality of image signals;
a tracking section that tracks the detection target in the area of interest on a basis of at least one of the first image signal and the second image signal;
a tracking controlling section that decides presence or absence of a movement of the detection target in the area of interest on a basis of the distribution and controls validity or invalidity of the tracking by the tracking section; and
an information outputting section that outputs a result of the tracking by the tracking section.

2. The information processing apparatus according to claim 1, wherein the tracking section tracks the detection target in the area of interest on a basis of the first image signal and the second image signal.

3. The information processing apparatus according to claim 1, wherein
the detection target includes a person,
the detection section calculates coordinate information of at least one of joints of the person, and
the setting section sets the area of interest for each of the joints of the person.

4. The information processing apparatus according to claim 3, wherein the tracking section tracks at least one of a posture of the person, a shape of arms of the person, a shape of fingers of the person, or a posture of an external apparatus worn or held by the person.

5. The information processing apparatus according to claim 3, wherein the tracking section calculates the coordinate information on a basis of a learned model constructed by learning a relation between an image of a person having a plurality of joints and coordinate information indicative of positions of the plurality of joints.

6. The information processing apparatus according to claim 3, wherein a result of the tracking by the tracking section includes the coordinate information.

7. A system comprising:
a first image sensor that generates a first image signal;
a second image sensor that includes a vision sensor of an event driven type that asynchronously generates a second image signal when a change in intensity of light incident on each of pixels is detected;
a detection section that detects a detection target on a basis of the first image signal;
a setting section that sets an area of interest in which at least part of the detection target is included;
a calculation section that calculates a distribution of the second image signal in the area of interest on a basis of the second image signal, wherein the second image signal is included in a plurality of image signals, and wherein the calculation section calculates the distribution based on at least one of a number of image signals of the plurality of image signals included in the area of interest or a distance from a center of the area of interest to each image signal of the plurality of image signals;
a tracking section that tracks the detection target in the area of interest on a basis of at least one of the first image signal and the second image signal;
a tracking controlling section that decides presence or absence of a movement of the detection target in the area of interest on a basis of the distribution and controls validity or invalidity of the tracking by the tracking section;
an information outputting section that outputs a result of the tracking by the tracking section; and
an information processing apparatus that includes a reception section that receives the result of the tracking and a control value calculation section that calculates a control value for feedback control to an external apparatus on a basis of the result of the tracking.

8. The system according to claim 7, wherein
the external apparatus includes a controller that includes at least one of a force sense presentation device that presents a force sense, a vibration device, and a sound outputting device,
the information processing apparatus includes a control value outputting section that outputs the control value to the controller, and
the control value calculation section calculates the control value for feedback control for at least one of the force sense presentation device, the vibration device, and the sound outputting device.

9. The system according to claim 7, wherein
the external apparatus includes a display apparatus,
the information processing apparatus includes an image generation section that generates a display image to be displayed on the display apparatus, according to the control value, and the control value calculation section calculates the control value for feedback control for the display image.

10. The system according to claim 8, wherein the information processing apparatus includes a server.

11. An information processing method comprising:
receiving a first image signal generated by a first image sensor;
receiving a second image signal generated by a second image sensor that includes a vision sensor of an event driven type that asynchronously generates an image signal when a change in intensity of light incident on each of pixels is detected;
detecting a detection target on a basis of the first image signal;
setting an area of interest in which at least part of the detection target is included;
calculating a distribution of the second image signal in the area of interest, wherein the second image signal is included in a plurality of image signals, and wherein the calculation section calculates the distribution based on at least one of a number of image signals of the plurality of image signals included in the area of interest or a distance from a center of the area of interest to each image signal of the plurality of image signals;

performing tracking for the detection target in the area of interest on a basis of at least one of the first image signal and the second image signal;

deciding presence or absence of a movement of the detection target in the area of interest on a basis of the distribution and controlling validity or invalidity of the tracking; and outputting a result of the tracking.

12. A non-transitory, computer-readable storage medium containing a computer program, which when executed by a computer, causes the computer to carry out actions, comprising:

receiving a first image signal generated by a first image sensor;

receiving a second image signal generated by a second image sensor that includes a vision sensor of an event driven type that asynchronously generates an image signal when a change in intensity of light incident on each of pixels is detected;

detecting a detection target on a basis of the first image signal;

setting an area of interest in which at least part of the detection target is included;

calculating a distribution of the second image signal in the area of interest, wherein the second image signal is included in a plurality of image signals, and wherein the calculation section calculates the distribution based on at least one of a number of image signals of the plurality of image signals included in the area of interest or a distance from a center of the area of interest to each image signal of the plurality of image signals;

performing tracking for the detection target in the area of interest on a basis of at least one of the first image signal and the second image signal;

deciding presence or absence of a movement of the detection target in the area of interest on a basis of the distribution and controlling validity or invalidity of the tracking; and outputting a result of the tracking.

13. The information processing apparatus according to claim 1, wherein the calculation section calculates the distribution on a logarithmic scale.

14. The information processing method of claim 11, wherein
the detection target includes a person,
detecting the detection target includes calculating coordinate information of at least one of joints of the person, and
the area of interest is set for each of the joints of the person.

15. The information processing method of claim 14, wherein tracking the detection target includes tracking at least one of a posture of the person, a shape of arms of the person, a shape of fingers of the person, or a posture of an external apparatus worn or held by the person.

16. The information processing method of claim 14, wherein tracking the detection target includes calculating the coordinate information on a basis of a learned model constructed by learning a relation between an image of a person having a plurality of joints and coordinate information indicative of positions of the plurality of joints.

17. The information processing method of claim 14, wherein a result of the tracking includes the coordinate information.

18. The non-transitory, computer-readable storage medium of claim 12, the actions further comprising:
receiving the result of the tracking; and
calculating a control value for feedback control based on the result of the tracking.

19. The non-transitory, computer-readable storage medium of claim 18, the actions further comprising:
outputting the control value for feedback control; and
calculating the control value for feedback control for at least one of a force sense presentation device that presents a force sense, a vibration device, and a sound outputting device.

20. The non-transitory, computer-readable storage medium of claim 18, the actions further comprising:
displaying an image according to the control value; and
calculating the control value for feedback control for the display image.

* * * * *